United States Patent
Biddick et al.

(10) Patent No.: US 10,900,285 B2
(45) Date of Patent: Jan. 26, 2021

(54) LUBRICATING DOWNHOLE-TYPE ROTATING MACHINES

(71) Applicant: Upwing Energy, LLC, Cerritos, CA (US)

(72) Inventors: David Biddick, Houston, TX (US); Patrick McMullen, Yorba Linda, CA (US); Herman Artinian, Huntington Beach, CA (US)

(73) Assignee: Upwing Energy, LLC, Cerritos, CA (US)

( * ) Notice: Subject to any disclaimer, the term of this patent is extended or adjusted under 35 U.S.C. 154(b) by 10 days.

(21) Appl. No.: 16/381,930

(22) Filed: Apr. 11, 2019

(65) Prior Publication Data

US 2020/0325728 A1  Oct. 15, 2020

(51) Int. Cl.

| | | |
|---|---|---|
| *E21B 4/02* | (2006.01) | |
| *E21B 43/12* | (2006.01) | |
| *E21B 4/00* | (2006.01) | |
| *F16C 33/66* | (2006.01) | |
| *F04B 39/02* | (2006.01) | |
| *E21B 41/00* | (2006.01) | |

(52) U.S. Cl.
CPC ............... *E21B 4/003* (2013.01); *E21B 4/02* (2013.01); *E21B 43/121* (2013.01); *F04B 39/0207* (2013.01); *F16C 33/6659* (2013.01); *E21B 41/0085* (2013.01); *F05B 2260/98* (2013.01)

(58) Field of Classification Search
CPC .... E21B 41/0085; E21B 43/121; E21B 4/003; E21B 4/02
See application file for complete search history.

(56) References Cited

U.S. PATENT DOCUMENTS

| | | | |
|---|---|---|---|
| 4,276,002 A | 6/1981 | Anderson | |
| 4,541,782 A | 9/1985 | Mohn | |
| 8,985,967 B2 * | 3/2015 | Gudivada | ............. F04D 13/043 417/408 |
| 9,598,937 B2 * | 3/2017 | Chen | ........................ F03B 13/02 |
| 10,253,606 B1 * | 4/2019 | Artinian | .................. E21B 41/02 |
| 10,370,947 B1 * | 8/2019 | Artinian | .................. E21B 41/02 |
| 2002/0011337 A1 | 1/2002 | Grant | |
| 2013/0136634 A1 | 5/2013 | Saele | |
| 2015/0108767 A1 * | 4/2015 | Winslow | ................. E21B 4/006 290/1 C |
| 2015/0345260 A1 * | 12/2015 | Green | ................... H02K 11/33 310/68 R |

(Continued)

*Primary Examiner* — Kenneth L Thompson
(74) *Attorney, Agent, or Firm* — Fish & Richardson P.C.

(57) ABSTRACT

A downhole-type device includes a fluid-end with a fluid rotor configured to move or be rotated by wellbore fluids. A fluid stator surrounds and supports the fluid rotor. A first bearing couples the fluid rotor to the fluid stator. A second bearing couples the fluid rotor to the fluid stator. An electric machine includes an electrical rotor rotably coupled to the fluid rotor. The electric rotor is configured to rotate in unison with the fluid rotor. An electrical stator surrounds and supports the electric rotor. A lubrication system is fluidically coupled to the downhole-type device. The lubrication system includes a topside pressure pump. A downhole-type distribution manifold is within a wellbore. The distribution manifold fluidically connects to the topside pressure pump, the first bearing, and the second bearing.

7 Claims, 7 Drawing Sheets

(56) References Cited

U.S. PATENT DOCUMENTS

| | | | |
|---|---|---|---|
| 2015/0361766 A1* | 12/2015 | Downie | E21B 41/0085 |
| | | | 175/41 |
| 2016/0145975 A1* | 5/2016 | Carroll | H02K 7/1823 |
| | | | 166/244.1 |
| 2017/0183942 A1 | 6/2017 | Veland | |
| 2018/0180055 A1* | 6/2018 | McMullen | E21B 43/121 |
| 2018/0209425 A1 | 7/2018 | Solberg et al. | |
| 2018/0340413 A1* | 11/2018 | Shah | F01D 21/00 |

\* cited by examiner

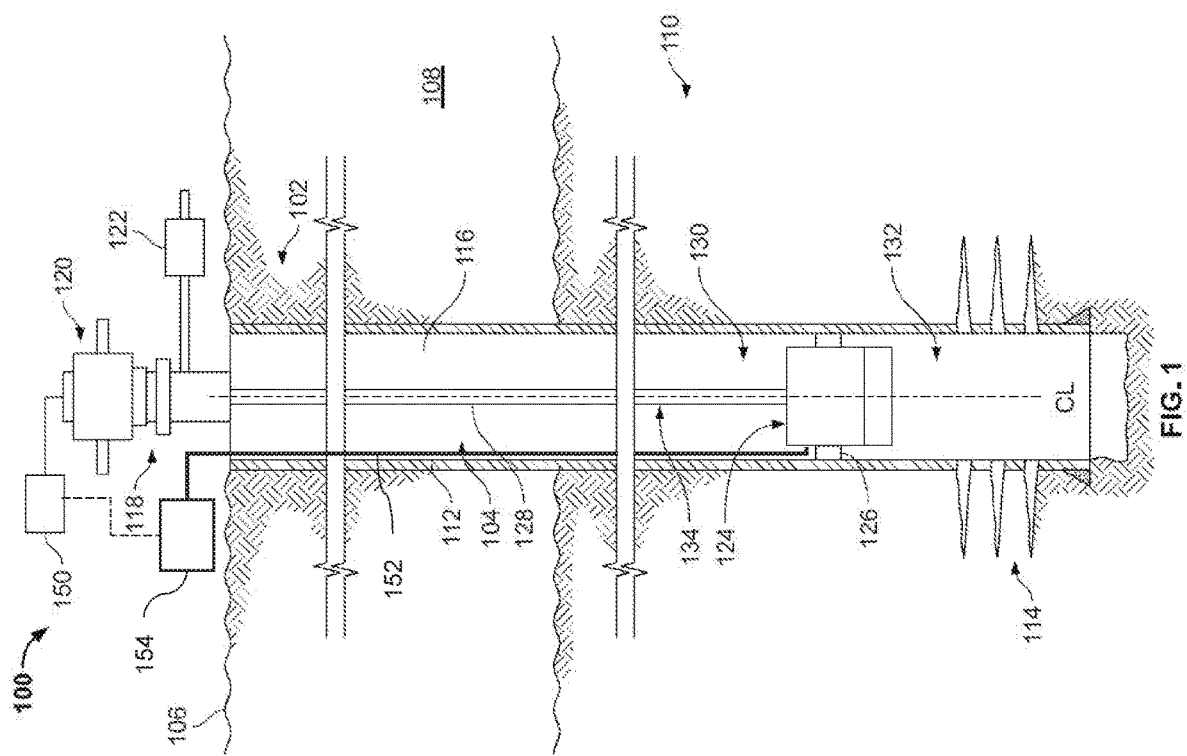

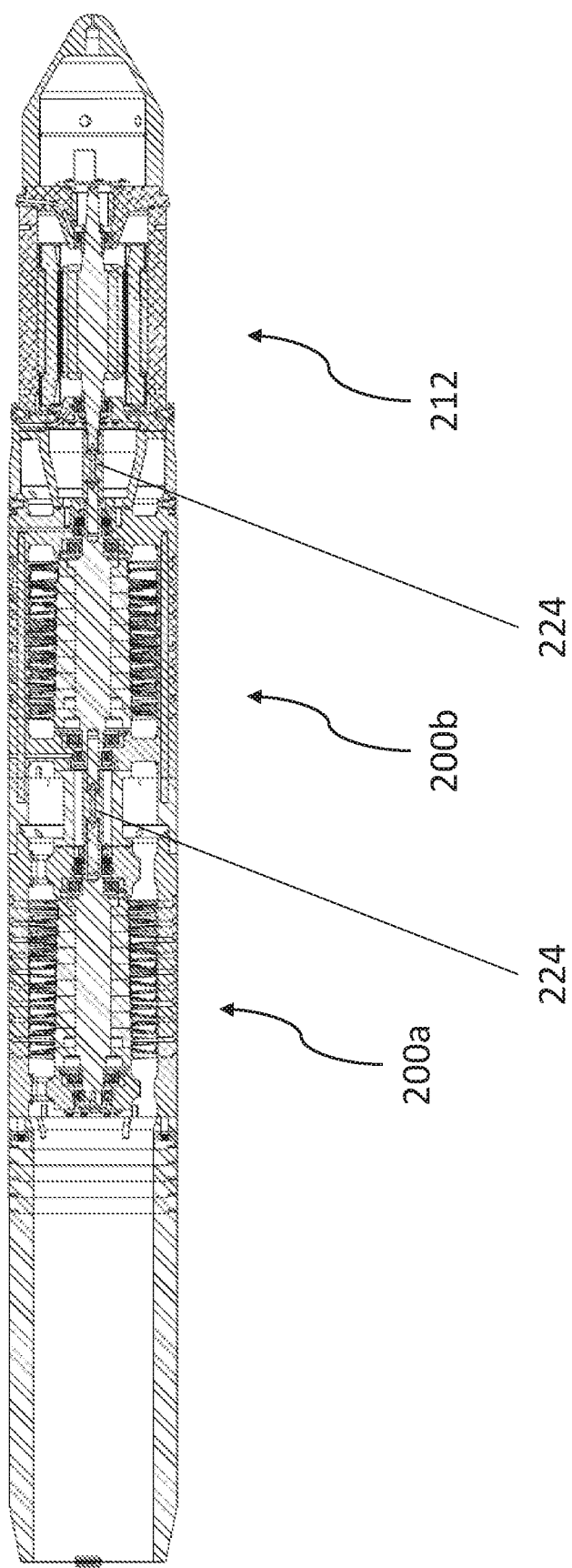

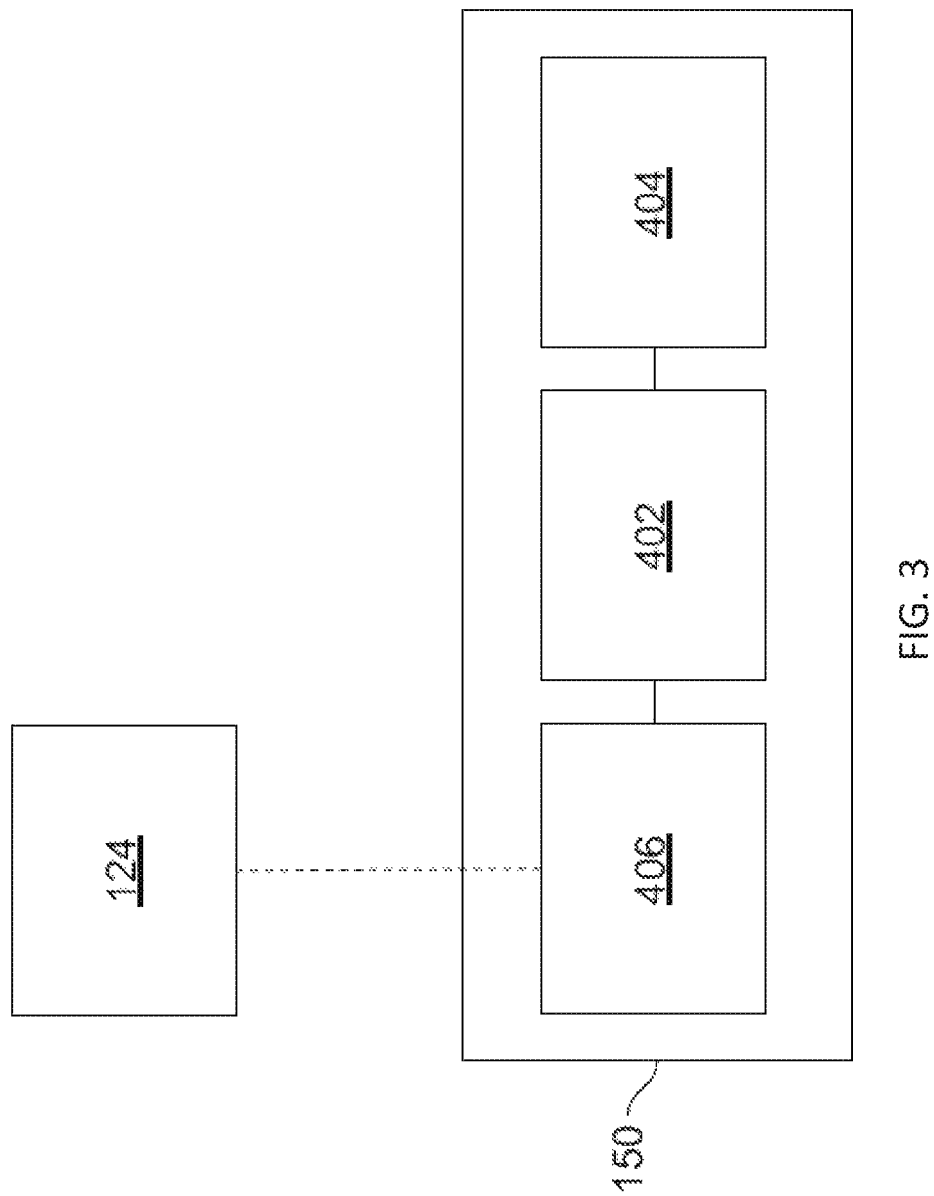

LUBRICATING DOWNHOLE-TYPE ROTATING MACHINES

TECHNICAL FIELD

This disclosure relates to lubrication systems for downhole-type rotating machines, including downhole compressors, blowers, pumps, and generators.

BACKGROUND

Most wells behave characteristically different over time due to geophysical, physical, and chemical changes in the subterranean reservoir that feeds the well. For example, it is common for well production to decline. This decline in production can occur due to declining pressures in the reservoir, and can eventually reach a point where there is not enough pressure in the reservoir to economically realize production through the well to the surface. Downhole pumps and/or compressors can be deployed into the well to increase production. Additionally or alternatively, a top side compressor and/or pump are sometimes used to extend the life of the well by decreasing pressure at the top of the well.

SUMMARY

This disclosure relates to lubricating downhole type rotating machines.

An example implementation of the subject matter described within this disclosure is a well system with the following features. A downhole-type device includes a fluid-end with a fluid rotor configured to move or be rotated by wellbore fluids. A fluid stator surrounds and supports the fluid rotor. A first bearing couples the fluid rotor to the fluid stator. A second bearing couples the fluid rotor to the fluid stator. An electric machine includes an electrical rotor rotably coupled to the fluid rotor. The electric rotor is configured to rotate in unison with the fluid rotor. An electrical stator surrounds and supports the electric rotor. A lubrication system is fluidically coupled to the downhole-type device. The lubrication system includes a topside pressure pump. A downhole-type distribution manifold is within a wellbore. The distribution manifold fluidically connects to the topside pressure pump, the first bearing, and the second bearing.

Aspects of the example implementation, which can be combined with the example implementation alone or in combination, include the following. The first bearing includes a radial ball bearing.

Aspects of the example implementation, which can be combined with the example implementation alone or in combination, include the following. The second bearing includes a thrust bearing.

Aspects of the example implementation, which can be combined with the example implementation alone or in combination, include the following. The first bearing includes a radial bearing and a thrust bearing.

Aspects of the example implementation, which can be combined with the example implementation alone or in combination, include the following. The distribution manifold includes a first flow restriction between the topside pressure pump and the first bearing, and a second flow restriction, different from the first flow restriction, between the topside pressure pump and the second bearing.

Aspects of the example implementation, which can be combined with the example implementation alone or in combination, include the following. The first flow restriction or the second flow restriction include a restriction orifice.

Aspects of the example implementation, which can be combined with the example implementation alone or in combination, include the following. A controller is configured to measure a parameter of the downhole-type device, and, change a rate of lubrication to the first bearing or the second bearing in response to the measured parameter.

An example implementation of the subject matter described within this disclosure is a method of lubricating a downhole-type rotating machine with the following features. A rotor is rotated within a stator. The rotor is supported to the stator by a bearing. The rotor and the stator are positioned entirely within a wellbore. Lubrication is provided to a bearing at a specified rate from a topside facility.

Aspects of the example implementation, which can be combined with the example implementation alone or in combination, include the following. The bearing is a first bearing and the specified rate is a first specified rate. The method further includes providing lubrication to a second bearing at a second specified rate from a topside facility. The second specified rate is different from the first specified rate.

Aspects of the example implementation, which can be combined with the example implementation alone or in combination, include the following. Providing lubrication to a bearing at a specified rate includes flowing lubrication through a pre-sized flow restriction within a lubrication line.

Aspects of the example implementation, which can be combined with the example implementation alone or in combination, include the following. Providing lubrication to a bearing at a specified rate includes adjusting a flowrate from the topside facility.

Aspects of the example implementation, which can be combined with the example implementation alone or in combination, include the following. The specified rate is a first specified rate. The method further includes providing lubrication to the bearing at a second specified rate from a topside facility in response to a changed rotor load.

Aspects of the example implementation, which can be combined with the example implementation alone or in combination, include the following. The provided lubrication includes a well treatment chemical.

Aspects of the example implementation, which can be combined with the example implementation alone or in combination, include the following. The well treatment chemicals include a corrosion inhibitor, a defoamer, a paraffin inhibitor, a wetting agent, or a hydrate inhibitor.

An example implementation of the subject matter described within this disclosure is a lubrication system with the following features. A downhole-type distribution manifold is within a wellbore. The distribution manifold fluidically connects to a topside pressure pump, a first bearing within a downhole pump positioned within a wellbore, and a second bearing within the downhole pump positioned within a wellbore.

Aspects of the example implementation, which can be combined with the example implementation alone or in combination, include the following. The first bearing includes a thrust bearing.

Aspects of the example implementation, which can be combined with the example implementation alone or in combination, include the following. The second bearing includes a radial bearing.

Aspects of the example implementation, which can be combined with the example implementation alone or in combination, include the following. The distribution manifold includes a first flow restriction between the topside pressure pump and the first bearing, and a second flow restriction between the topside pressure pump and the second bearing.

Aspects of the example implementation, which can be combined with the example implementation alone or in combination, include the following. The first flow restriction or the second flow restriction include a restriction orifice.

Aspects of the example implementation, which can be combined with the example implementation alone or in combination, include the following. The first flow restriction and the second flow restriction are sized to provide different flow rates.

Aspects of the example implementation, which can be combined with the example implementation alone or in combination, include the following. The topside pressure pump includes a variable speed pump.

Other features, objects, and advantages of the subject matter will be apparent from the description and drawings, and from the claims.

DESCRIPTION OF DRAWINGS

FIG. 1 is a schematic side cross sectional view of an example well system.

FIGS. 2A-2C are side cross sectional views of example downhole-type lift systems.

FIG. 3 is a schematic block diagram of an example controller that can be used with aspects of this disclosure.

Like reference symbols in the various drawings indicate like elements.

DETAILED DESCRIPTION

Figure 2A:
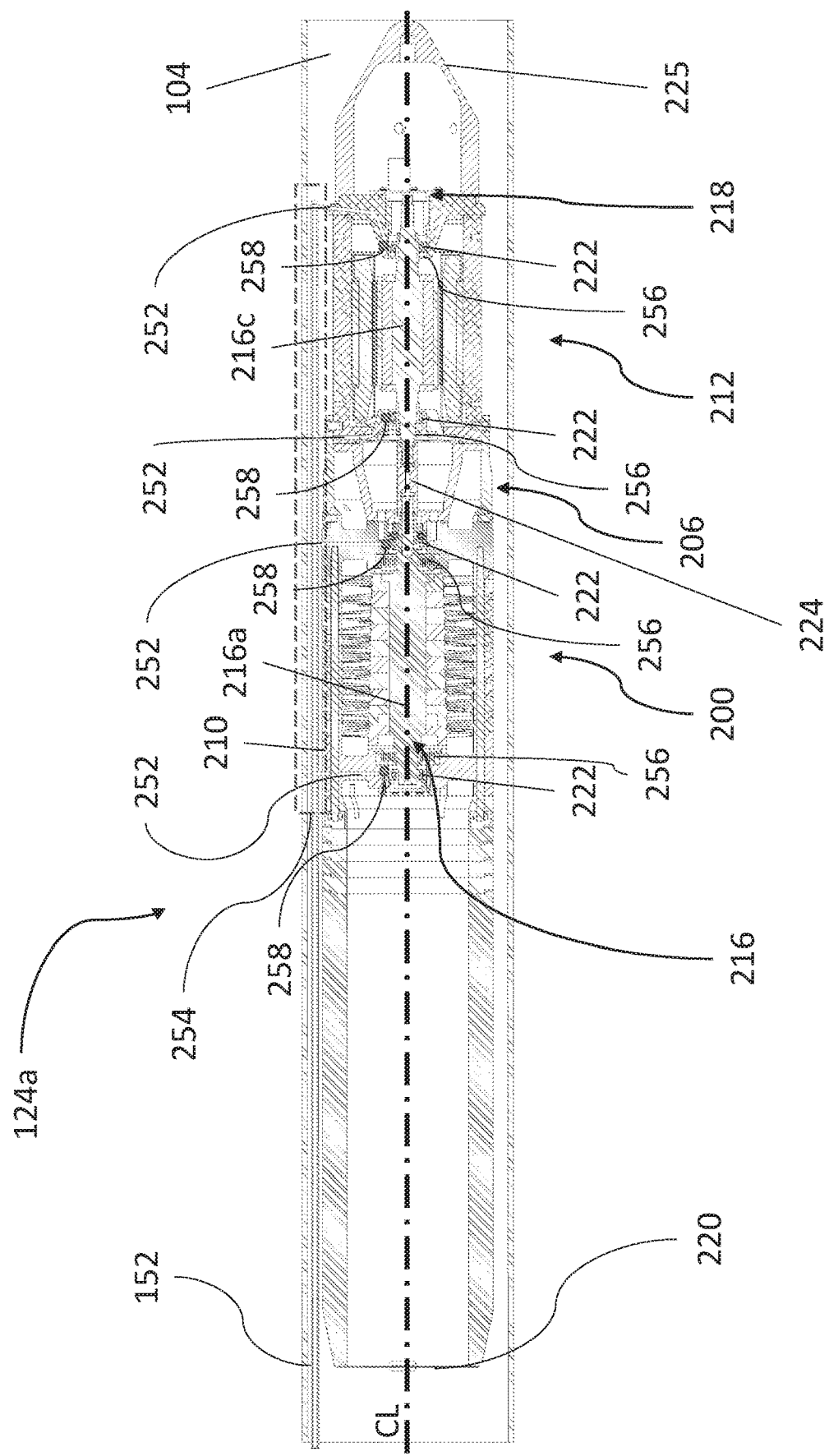

This disclosure describes a control system of an artificial lift system that includes a downhole-type rotating machine, such as a compressor, blower, pump, or generator. Use of such artificial lift systems can increase production from wells. In some implementations, the bearing lubrication system of the artificial lift system are isolated from the production fluid via seal chambers or zones, typically flooded in the lubrication fluid and pressure compensated to the downhole environment to minimize leakage and contamination with the production fluid. While this approach offers use in low speed applications, higher speed applications suffer from the high windage losses from this flooded approach. The artificial lift systems described herein can be more reliable than comparable artificial lift systems with the elimination of a fixed lubrication reservoir located downhole that uses seals that wear and slowly leak, resulting in lower total capital costs over the life of a well. The artificial lift systems described herein also offer improved performance by being able to achieve higher operating speeds, all while using conventional lubricated bearing systems. The downhole-type rotating machine is provided lubrication by an adjustable topside pressure source that is renewed/refilled as needed, where lubrication used in the device is ultimately recovered in the production flow that comes to the surface. The modular characteristic of the artificial systems described herein allows for variability in design and customization to cater to a wide range of operating conditions and applications, including wells producing liquid, gas, and combinations of both.

FIG. 1 depicts an example well system 100 constructed in accordance with the concepts herein. The well system 100 includes a well 102 having a wellbore 104 that extends from the terranean surface 106 through the earth 108 to one or more subterranean zones of interest 110 (one shown). The well system 100 enables access to the subterranean zones of interest 110 to allow recovery, i.e., production, of fluids to the terranean surface 106 and, in certain instances, additionally or alternatively allows fluids to be placed in the earth 108. In certain instances, the subterranean zone of interest 110 is a formation within the Earth defining a reservoir, but in other instances, the subterranean zone of interest 110 can be multiple formations or a portion of a formation. For the sake of simplicity, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a well that is used in producing hydrocarbon production fluid from the subterranean zones of interest 110 to the terranean surface 106. The well may produce only dry gas, liquid hydrocarbons, and/or water. In certain instances, the production from the well 102 can be multiphase in any ratio. The well can produce mostly or entirely liquid at certain times and mostly or entirely gas at other times. For example, in certain types of wells, it is common to produce water for a period of time to gain access to the gas in the subterranean zone. The concepts herein, though, are not limited in applicability to gas wells or even production wells, and could be used in wells for producing liquid resources such as oil, water or other liquid resources, and/or could be used in injection wells, disposal wells, or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the terranean surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threaded and/or otherwise) end-to-end. In FIG. 1, the casing 112 is perforated (i.e., having perforations 114) in the subterranean zone of interest 110 to allow fluid communication between the subterranean zone of interest 110 and the inner bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached to the wellhead 118. The Christmas tree 120 includes valves used to regulate flow into or out of the well 102.

FIG. 1 shows a surface compressor 122 residing on the terranean surface 106 and fluidly coupled to the well 102 through the Christmas tree 120. The surface compressor 122 can include a variable speed or fixed speed compressor. The well system 100 also includes a downhole-type artificial lift system 124 residing in the wellbore 104, for example, at a depth that is at or nearer to subterranean zone of interest 110 than the terranean surface 106. The surface compressor 122 operates to draw down the pressure inside the well 102 at the terranean surface 106 to facilitate production of fluids to the terranean surface 106 and out of the well 102. The downhole-type artificial lift system 124, being of a type configured in size and robust construction for installation within a well 102, assists by creating an additional pressure differential within the well 102. In particular, casing 112 is commercially produced in a number of common sizes specified by the American Petroleum Institute (the "API"), including 4½, 5, 5½, 6, 6⅝, 7, 7⅝, 16/8, 9⅝, 10¾, 11¾, 13⅜, 16, 18⅝ and 20 inches, and the API specifies internal diameters for each casing size. The downhole-type artificial lift system 124 can be configured to fit in and, (as discussed in more detail below) in certain instances, seal to the inner diameter of one of the specified API casing sizes. Of course, the downhole-type artificial lift system 124 can be made to fit in and, in certain instances, seal to other sizes of casing or tubing or otherwise seal to the wall of the wellbore 104.

Additionally, as a downhole-type artificial lift system 124 or any other downhole system configuration such as a pump, compressor, or multi-phase fluid flow aid that can be envisioned, the construction of its components is configured to withstand the impacts, scraping, and other physical challenges that the downhole-type artificial lift system 124 will encounter while being passed hundreds of feet/meters or even multiple miles/kilometers into and out of the wellbore 104. For example, the downhole-type artificial lift system 124 can be disposed in the wellbore 104 at a depth of up to 15,000 feet (4,572 meters). Beyond just a rugged exterior, this encompasses having certain portions of any electronics be ruggedized to be shock resistant and remain fluid tight during such physical challenges and during operation. Additionally, the downhole-type artificial lift system 124 is configured to withstand and operate for extended periods of time (e.g., multiple weeks, months, or years) at the pressures and temperatures experienced in the wellbore 104, temperatures which can exceed 400° F./205° C. and pressures over 2,000 pounds per square inch, and while submerged in the well fluids (gas, water, or oil as examples). Finally, as a downhole-type artificial lift system 124, the downhole-type artificial lift system 124 can be configured to interface with one or more of the common deployment systems, such as jointed tubing (i.e., lengths of tubing joined end-to-end, threaded and/or otherwise), a sucker rod, coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (e.g., coupling 220 discussed below, which can be a jointed tubing connector, coiled tubing connector, or wireline connector). In FIG. 1, the downhole-type artificial lift system 124 is shown deployed on wireline 128.

A seal system 126 integrated or provided separately with a downhole system, as shown with the downhole-type artificial lift system 124, divides the well 102 into an uphole zone 130 above the seal system 126 and a downhole zone 132 below the seal system 126. FIG. 1 shows the downhole-type artificial lift system 124 positioned in the open volume of the inner bore 116 of the casing 112, and not within or a part of another string of tubing in the well 102. The wall of the wellbore 104 includes the interior wall of the casing 112 in portions of the wellbore 104 having the casing 112, and includes the open-hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open-hole portions of the wellbore 104. In certain instances, the seal system 126 can form a gas and liquid tight seal at the pressure differential that the downhole-type artificial lift system 124 creates in the well 102. In some instances, the seal system 126 of the downhole-type artificial lift system 124 seals against the interior wall of the casing 112 or the open-hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type artificial lift system 124 from a pressure in the wellbore 104 uphole of the seal system 126 of the downhole-type artificial lift system 124. Although FIG. 1 includes both the surface compressor 122 and the downhole-type artificial lift system 124, in other instances, the surface compressor 122 can be omitted and the downhole-type artificial lift system 124 can provide the entire pressure boost in the well 102. While illustrated with the seal system 126, such a seal system can be eliminated in some instances. For example, when a packer and production tubing are used with the downhole-type artificial lift system 124.

In some implementations, the downhole-type artificial lift system 124 can be implemented to alter characteristics of a wellbore by a mechanical intervention at the source. Alternatively or in addition to any of the other implementations described in this specification, the downhole-type artificial lift system 124 can be implemented as a high flow, low pressure rotary device for gas flow in sub-atmospheric wells. Alternatively or in addition to any of the other implementations described in this specification, the downhole-type artificial lift system 124 can be implemented as a high pressure, low flow rotary device for gas flow in sub-atmospheric wells. Alternatively or in addition to any of the other implementations described in this specification, the downhole-type artificial lift system 124 can be implemented in a direct well-casing deployment for production through the wellbore. While the downhole-type artificial lift system 124 is described in detail as an example implementation of the downhole system, alternative implementations of the downhole system as a pump, compressor, or multiphase combination of these can be utilized in the well bore to effect increased well production.

The downhole system, as shown as the downhole-type artificial lift system 124, locally alters the pressure, temperature, and/or flow rate conditions of the fluid in the wellbore 104 proximate the downhole-type artificial lift system 124 (e.g., at the base of the wellbore 104). In certain instances, the alteration performed by the downhole-type artificial lift system 124 can optimize or help in optimizing fluid flow through the wellbore 104. As described above, the downhole-type artificial lift system 124 creates a pressure differential within the well 102, for example, particularly within the wellbore 104 the downhole-type artificial lift system 124 resides in. In some instances, a pressure at the base of the wellbore 104 is a low pressure (e.g., sub-atmospheric or insufficient to overcome the static head and friction losses of the well), so unassisted fluid flow in the wellbore can be slow or stagnant. In these and other instances, the downhole-type artificial lift system 124 introduced to the wellbore 104 adjacent the perforations 114 can reduce the pressure in the wellbore 104 near the perforations 114 to induce greater fluid flow from the subterranean zone of interest 110, increase a temperature of the fluid entering the downhole-type artificial lift system 124 to reduce condensation from limiting production, and increase a pressure in the wellbore 104 uphole of the downhole-type artificial lift system 124 to increase fluid flow to the terranean surface 106.

The downhole system, as shown as the downhole-type artificial lift system 124, moves the fluid at a first pressure downhole of the fluid module 200 to a second, higher pressure uphole of the downhole-type artificial lift system 124. The downhole-type artificial lift system 124 can operate at and maintain a pressure ratio across the downhole-type artificial lift system 124 between the second, higher uphole pressure and the first, downhole pressure in the wellbore. The pressure ratio of the second pressure to the first pressure can also vary, for example, based on an operating speed of the downhole-type artificial lift system 124, as described in more detail below. In some instances, the pressure ratio across the downhole-type artificial lift system 124 is less than 2:1, where a pressure of the fluid uphole of the downhole-type artificial lift system 124 (i.e., the second, higher pressure) is at or below twice the pressure of the fluid downhole of the downhole-type artificial lift system 124 (i.e., the first pressure). For example, the pressure ratio across the downhole-type artificial lift system 124 can be about 1.125:1, 1.5:1, 1.75:1, 2:1, or another pressure ratio between 1:1 and 2:1. In certain instances, the downhole-type artificial lift system 124 is configured to operate at a pressure ratio of greater than 2:1.

The downhole system, as shown as the downhole-type artificial lift system 124, can operate in a variety of downhole conditions of the wellbore 104. For example, the initial pressure within the wellbore 104 can vary based on the type of well, depth of the well 102, production flow from the perforations into the wellbore 104, and/or other factors. In some examples, the pressure in the wellbore 104 proximate a bottomhole location is sub-atmospheric, where the pressure in the wellbore 104 is at or below about 14.7 pounds per square inch absolute (psia), or about 101.3 kiloPascal (kPa). The downhole-type artificial lift system 124 can operate in sub-atmospheric wellbore pressures, for example, at wellbore pressure between 2 psia (13.8 kPa) and 14.7 psia (101.3 kPa). In some examples, the pressure in the wellbore 104 proximate a bottomhole location is much higher than atmospheric, where the pressure in the wellbore 104 is above about 14.7 pounds per square inch absolute (psia), or about 101.3 kiloPascal (kPa). The downhole-type artificial lift system 124 can operate in above atmospheric wellbore pressures, for example, at wellbore pressure between 14.7 psia (101.3 kPa) and 15,000 psia (103,421 kPa).

A controller 150 for a downhole system, shown as the downhole-type artificial lift system 124, is in some implementations, located topside to maximize reliability and serviceability. Details about the controller 150 are described later within this disclosure. A controller 150, in some implementations, receives signals from well instrumentation (pressure, flow, temperature), the topside motor VSD (speed, power, torque), the topside oil supply system (lubrication flow, pressure, temperature), and any sensor and/or sensor electronics within the downhole-type artificial lift system 124, and uses this for input as part of its operation and control algorithm. This algorithm output includes a current command to regulate rotor speed and lubrication rates within the downhole-type artificial lift system 124 (details are explained in greater detail later within the disclosure). This loop typically happens very fast, on the order of 1,000-20,000 times a second depending on the system control requirements. This control system is also capable of determining the bearing lubrication requirements based on speed, power, fluid flow, and fluid pressures in the well. Analog circuit based controllers can also perform this function. Having this controller 150 topside allows for easy communication, service, and improved up-time for the system, as any issues can be resolved immediately via local or remote support. Downhole electronics are also an option either proximate to the device or at a location more thermally suitable. In a downhole implementation, the electronics are packaged to isolate them from direct contact with the downhole environment. Downhole electronics, in certain instances, offer better control since they do not suffer with long cable delay and response issues.

Lubrication is provided with a topside pressure source 154. The topside pressure source can include a pump, a flow regulator, a pressure regulator, a pressurized vessel, valving, and any other equipment to provide lubrication to the artificial lift system 124. The topside pressure source 154 is fluidically connected to the artificial lift system 124 by a main lubrication line 152. In addition to standard lubrication, the topside pressure source can provide well treatment chemicals to the artificial lift system. Such chemicals can include corrosion inhibitors, defoamers, such as alkoxylated alcohol, paraffin inhibitors, such as xylene, toluene and benzene, wetting agents, such as certain soaps, and hydrate inhibitors, such as methanol or monoethylene glycol (MEG). For especially corrosive chemicals, different metallurgy could be utilized for bearing systems or coatings applied. These could include nickel and chromium based surface applications, as well as nickel based or super alloys. In addition, ceramic roller elements could be selected for use in more aggressive fluid. The bearing cage material would have to be selected with the chemical constituents in mind whether they be metallic or thermoplastic. More details on the lubrication system are described throughout this disclosure.

Figure 2C:
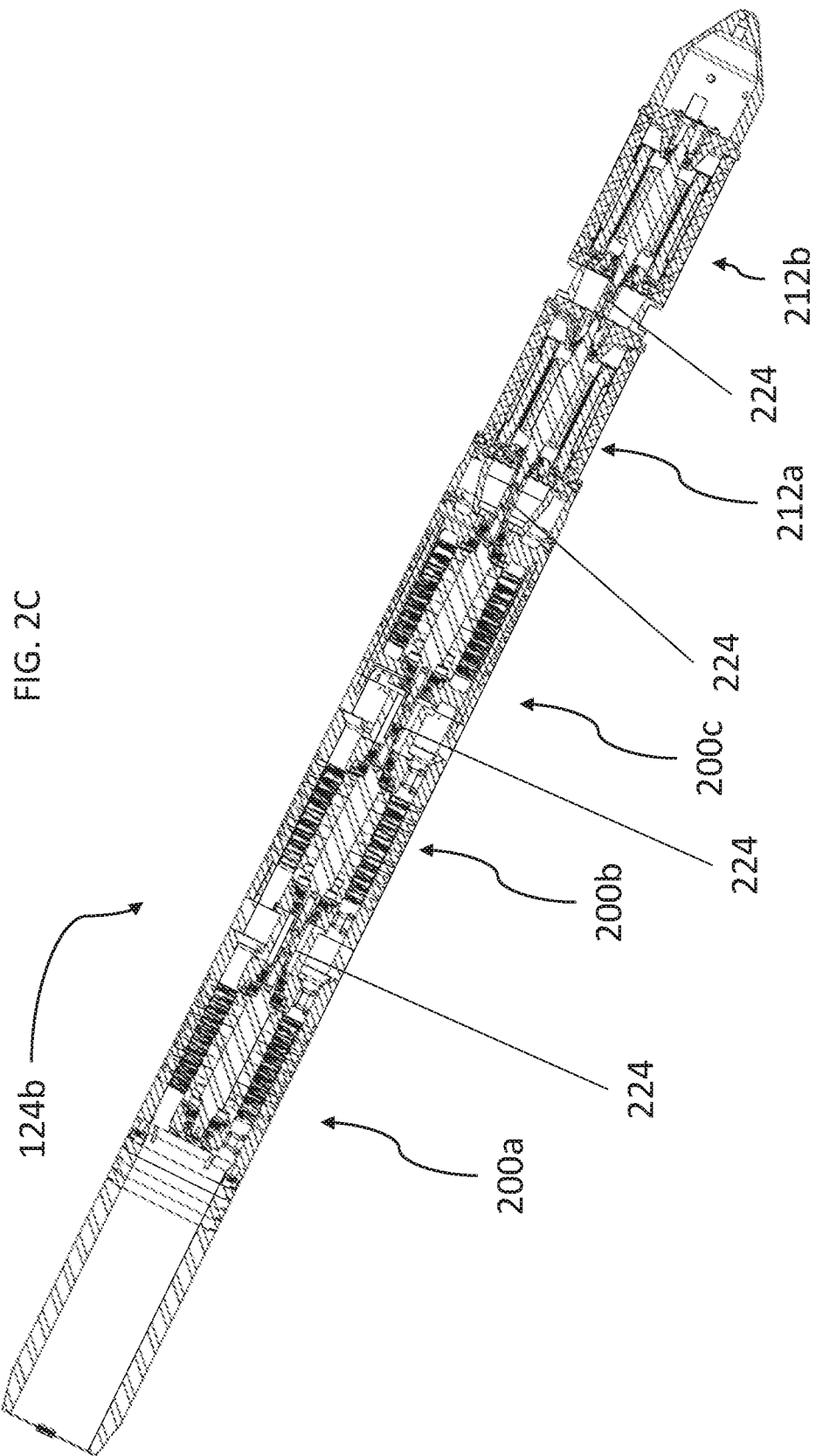

An example downhole system, shown as the downhole-type artificial lift system 124, is depicted schematically in FIG. 1. FIG. 2A is a half side cross-sectional view of the example downhole-type artificial lift system 124. Referring to FIGS. 1-2C, the example downhole-type artificial lift system 124 includes a fluid module 200 and an electric machine 204. In the context of this disclosure, an uphole end or direction is an end nearer or moving in a direction towards the terranean surface 106. A downhole end or direction is an end nearer of moving in a direction away from the terranean surface 106. An implementation of the fluid module 200 within the well is described and the description is applicable even if the fluid module 200 is positioned outside of the wellbore 104. A coupling 220 is positioned at an uphole-end of the fluid module 200. The coupling can be of a type used for a wireline connection, a tubing connection, or any other connection configured to support the weight of the downhole-type artificial lift system 124. The coupling 220, in certain instances, can include a standard attachment method to attach the downhole-type artificial lift system 124 to a support system. For example, a threaded interface can be used for sucker rod, or a set of bolts can be used to attach two flanges together for production tubing.

The fluid module 200 includes an inlet 206 to receive a fluid at the first pressure downhole of the fluid module 200 and an outlet 208 to output the fluid at the second, higher pressure uphole of the fluid module 200. The inlet 206 can include a filter to limit particle sizes above a certain threshold from entering the downhole-type artificial lift system 124. A cylindrical outer housing 210 houses an impeller in fluid communication with the inlet 206 to receive the fluid from the wellbore 104 at the first pressure downhole of the fluid module 200 and to drive the fluid to the outlet 208 at the second, higher pressure uphole of the fluid module 200. The inlet 206 includes a series of holes evenly spaced around the circumference of the outer housing 210 and oriented in a downhole trajectory. The outlet 208 includes a series of holes evenly spaced around the circumference of the outer housing 210 and oriented in an uphole trajectory. With the downhole-type artificial lift system 124 residing in the wellbore 104, the inlet 206 is at a downhole end of the fluid module 200 and the outlet 208 is at an uphole end of the fluid module 200.

At a downhole end of the downhole-type artificial lift system 124 is a conical tip 225. The conical tip 225 reduces the pressure drop across the downhole-type artificial lift system 124. In some implementations, the conical tip 225 can house electronics that can be used in aspects of operation of the downhole-type artificial lift system 124 or for sensors.

In some instances, the downhole-type artificial lift system 124 can be positioned in the well with the downhole inlet 206 positioned adjacent to the perforations 114 in the wellbore 104. For example, the fluid module 200 can be positioned in the wellbore 104 such that the inlet 206 is disposed next to and immediately uphole of the perforations 114 to maximize or improve the fluid flow from the perforations into the fluid module 200. In some examples, the inlet 206 may not be adjacent to perforations 114, such as the inlet 206 being positioned greater than about twenty feet away from the perforations 114. In some instances, a speed of the fluid module 200 is adjusted based on the fluid flow from the subterranean zone into the wellbore 104 (e.g., via perforations 114). For example, as the fluid flow from the subterranean zone into the wellbore 104 decreases, a speed of the fluid module 200 can increase to draw more fluid flow from the subterranean zone into the wellbore 104.

As previously described, the downhole-type artificial lift system 124 moves the fluid from the downhole inlet 206 at the first pressure to the uphole outlet 208 at the second, higher pressure. This pressure differential promotes the fluid flow to move uphole of the downhole-type artificial lift system 124, for example, at a higher flow rate compared to a flow rate in a wellbore without a downhole-type artificial lift system 124. The fluid module 200 can operate at a variety of speeds, for example, where operating at higher speeds increases fluid flow, and operating at lower speeds reduces fluid flow. In some instances, the fluid rotor 216a and/or the electric machine rotor 216c can operate at speeds between 600-3,600 revolutions per minute (rpm). In some instances, the fluid rotor 216a and/or the electric machine rotor 216c can operate at speeds between 3,600-5,000 rpm. In some instances, the fluid rotor 216a and/or the electric machine rotor 216c can operate at high-speeds, for example, 5,000-120,000 rpm. For the downhole-type artificial lift system 124 illustrated, the maximum operating speed is 60,000 rpm. Specific operating speeds for the downhole system are defined based on the fluid, pressures and flows for the well parameters and desired performance. Speeds may be as low as 5,000 rpm or as high as 120,000 rpm. Special design considerations are made to rotate at such speeds. For example, a high-speed machine (e.g., 5,000-120,000 rpm machine) can include higher strength materials for rotating components than a similarly sized low-speed machine (e.g., 600-3,600 rpm machine). Balancing requirements are more stringent for a high-speed machine as well. In general, a high-speed machine is arranged to reduce the radius of the spinning components. Such a task can be done by elongating the topology of the machine so that there is no need for component radial overlap. For example, a stator coil can be longitudinally separated from a coupling so that there is no radial overlap between the coupling and the stator coil. Such separation allows the stator coils and rotor to have a smaller diameter and tighter clearances as they do not have to surround a large coupling. In some implementations, the downhole-type artificial lift system 124 rotates the central shaft 216, which includes the fluid rotor 216a and the electric machine rotor 216c, to rotate in unison. That is, the central shaft 216 rotates as a direct drive system. Having separate components of the central shaft that are coupled, but rotodynamically isolated (e.g. entirely isolated, substantially isolated, or reduce the transmission of rotodynamic forces) from one-another, allows the downhole-type artificial lift system 124 to rotate at high speeds while maintaining rotodynamic stability. This is because the first critical speed (first harmonic) of the individual component shafts is higher than a single shaft of equivalent total length to the smaller components. While the downhole system has an optimal speed range at which it is most efficient, this does not prevent the downhole system from running at less efficient speeds to achieve a specified flow for a particular well, as well characteristics change over time.

FIG. 2A further illustrates an example downhole-type artificial lift system 124a that can be used as the downhole-type artificial lift system 124 previously described. An electric machine 212 and the fluid module 200 are coupled together on a central shaft 216. The electric machine 212 is configured to rotatably drive or be driven to generate electricity by the fluid module 200. That is, the electric machine 212 can be configured to act as a motor and/or generator. Throughout this description, electric machine, generator, and motor may be used interchangeably. The central shaft 216 is axially supported by a bearing assembly 222 located at a downhole end of the downhole-type artificial lift system 124. As illustrated, the mechanical ball bearing 222 can support both the radial load at the bottom-end of the rotor 216c and the thrust load of the motor rotor 216c. There is no specific thrust bearing assembly shown, though such an implementation can be done without departing from this disclosure. In such an implementation, a pin bearing, fluid film bearing, hydrostatic bearing, or tilting pad bearing can be used. An example mechanical bearing 222 that can support both radial and axial loads is an angular contact ball bearing. One or more angular contact ball bearings can be used in series to reduce the specific axial and radial load that each bearing needs to support. Similarly in the fluid module 200, where axial loads are not transmitted through the coupling 224, connecting the motor and compressor rotors. The bearings in the fluid module 200 support the axial loads of the compressor module shaft in the same manner as the motor axial bearing. Also, the location of the one or more thrust bearing assemblies 218 can differ in different implementations of the downhole-type artificial lift system. The thrust bearing 218 can include any mechanical bearing, such as a tilted pad bearing, a pin bearing, ball bearing or an anti-friction bearing. The thrust bearing 218 is provided lubrication at a specified rate from a lubrication line 252 (shown as a passageway in fluid communication with line 152). In some implementations, the lubrication line 252 supplying the thrust bearing 218 includes a flow restriction 258 to regulate the lubrication rate. In some implementations, the flow restrictions 258 can include passive components, such as a restriction orifice, a metering valve, or a piece of porous media. In some implementations, the flow restrictions 258 can include active components, such as active control valves. More details on the lubrication system are provided throughout this disclosure.

One or more radial bearing assemblies 222 (four shown) radially support the central shaft 216. Fewer or more radial bearing assemblies 222 can be provided. Also, the location of the one or more radial bearing assemblies 222 can differ in different implementations of the downhole-type artificial lift system. The radial bearing assemblies 222 can include any mechanical bearing, such as a tilted pad bearing, a journal bearing, a pin bearing, ball bearing, or an anti-friction bearing. The radial bearing assembly is provided lubrication at a specified rate from a manifold lubrication line 252 (shown as a passageway in fluid communication with line 152) that is separate from the manifold lubrication line 252 supplying the thrust bearing 218. In some implementations, the lubrication line 252 to the radial bearing assemblies 222 includes a flow restriction 258 to regulate the lubrication rate, such as those described above. In certain instances, the flow restriction 258 is provided on both lubrication lines 252, and in other instances, the flow restriction 258 is included on one or the other of the lubrication lines 252. More details on the lubrication system are provided throughout this disclosure.

While one of each electric machine 212 and fluid module 200 modules are shown, more than one of each or all are practical in this configuration, thus allowing for additional motor power, additional thrust load support, and additional flow or pressure capacity to be added independently of each other to best produce the specific well performance. The bearing assemblies of such additional electric machines and fluid modules can include lubrication lines with or without flow restrictions. In addition, while the order of electric machine 212 and fluid module 200 module from downhole to uphole is shown, each module functions independently and can be placed in other orders that best suit the operation and integration of each module. Additionally, the fluid module 200 can be a compressor, a liquid pump, a multiphase pump, or a combination thereof that best suits the fluids and conditions of the well to maximize well performance. In some implementation, the fluid module 200 can be a turbine. In addition, passive magnetic radial bearing assemblies, passive magnetic thrust bearing assemblies, active magnetic radial bearing assemblies and active magnetic thrust bearing assemblies can be used to reduce bearing load on the thrust bearing 218, and/or the radial bearings 222. Passive magnetic thrust bearings can include permanent magnet passive thrust bearings and electro-magnet thrust bearing assemblies, where the latter can be powered via a local downhole generated constant or speed dependent current, or a topside generated constant or speed, motor drive power, fluid flow or other as an individual determinant or any combination of these as the determinant of current.

In FIG. 2A, the central shaft 216 comprises multiple sub-sections coupled together: a fluid rotor 216a and an electric rotor 216c. Each sub-section is joined together by a coupling 224. The coupling 224 can be a bellows, quill, diaphragm, or other coupling type that provides axial stiffness and radial compliance. A bellows-style coupling includes a spring positioned between two shafts. The spring has a high radial torsional stiffness allowing for torque transmission, but a low lateral stiffness and a low lateral moment stiffness that allows for rotodynamic "play" between the shafts during operation. A bellows-style coupling can be attached to each shaft in a variety of ways, such as with a clamping hub located on either end of the bellows-style coupling. A quill-style coupling includes a shaft with a significantly greater length to diameter ratio than either shaft that is being coupled. The thinner cross-section allows for a high radial torsional stiffness and a high axial stiffness. The thinner cross-section also allows for a low lateral moment stiffness that allows for rotodynamic "play" between the shafts during operation. Dimensions and stiffnesses are specific for each application. In certain instances, the coupling 224 can allow for angular misalignment of 0.30-2.0 degrees, and a lateral misalignment of 0.01 inches. Variation in thermal growth can be designed to be accepted in the compressor and motor clearances, though the coupling can tolerate about 0.03 inches of axial misalignment. In some implementations, the central shaft 216 can include a single, unitary shaft that runs through the fluid module 200, and the electric machine 212.

Each of the radial bearing assemblies 222 can be protected from produced fluids by a seal 256. The seal 256 can include a carbon ring seal, a labyrinth seal, or another type of seal. Each of the seals is configured to provide a leak path from the bearing to the produced fluid. Ingress by the production fluid can be prevented or reduced by a lubrication line 252 that provides lubrication to each of the radial bearing assemblies 222. The lubrication line can provide lubrication at a positive rate, meaning that lubrication flows through the bearing assembly 222, through the seal 256, and into the production fluid. In other words, lubrication can be provided at a higher pressure than the production fluid in any given section of the artificial lift system 124. Such pressure reduces the risk of ingress from the production fluid or particulates within the production fluid. Lubrication is provided to each of the individual lubrication lines 252 by a lubrication manifold 254. In some implementations the lubrication manifold 254 can be inside the pump housing 210. Alternatively or in addition, the lubrication manifold 254 can be outside the artificial lift system 124 and mounted to the outer housing 210. In some implementations, the lubrication manifold 254 can separate from the outer housing 210 only connected at fluid injection points (lubrication lines 252). The lubrication manifold 254 can be a rigid structure, coupled to the pump with flexible couplings. The lubrication manifold 254 can be integrated with the line 152 or be separate from the line 152 and coupled by a rigid or a flexible coupling. In some implementations, the lubrication manifold 254 can have a port for each line 252 or can gang lines 252 together. The lubrication manifold 254 fluidically connects the individual lubrication lines 252 to the main lubrication line 152. The main lubrication line is provided lubrication from the topside pressure source 154. Flow is regulated in each of the individual lines 252 by a flow restriction 258 within each line 252. Each flow restriction can be sized for individual bearings, for example, sizing can be based on the type of bearing. A thrust bearing may require a different lubrication rate than a radial bearing. Alternatively or in addition, the style of bearing can have an effect on restriction sizing. For example, a ball bearing may require a different restriction size than a fluid film bearing. Other factors that can be taken into account in sizing the each flow restriction can include bearing size, rotational speed, radial or axial loads on the bearings, or location within the downhole-type lifting device 124. For example, a bearing assembly 222 at a discharge end of the artificial lift system 124 may include a flow restriction 258 in the supply line 252 configured such that more pressure is supplied in comparison to a bearing assembly 222 positioned at an inlet 206 of the artificial lift system 124 due to pressure differences across the fluid end 200.

Lubrication flow can be controlled to optimize bearing performance and operating life. A number of factors can be used to determine and optimize the level of lubrication flow, including the equipment, lubrication, installation specifics, downhole device and the operational characteristics of the downhole device. Lubrication characteristics can include lubricity and viscosity of the lubrication. Equipment can include the lubrication pump and its pressure, flow, and temperature rise. Installation specifics can include the depth of the device for lubrication deployment and pipe size, both used to determine the static pressure for the oil at the device as well as the flow rates achievable. The downhole pressure and temperature can also factor into the necessary fluid being pumped and its impact on the lubrication. In addition, if the lubrication is also intended to or includes cleaner for the device it must be factored into determining the level of flow needed. Device characteristics can include manifold distribution characteristics, local bearing orifices, piping within the device, operating speed, and radial and axial loads on the bearings.

Sensitive electronic and magnetic components can be "canned" or otherwise isolated from the downhole environment without affecting their electromagnetic characteristics. In some implementations, a magnetic coupling can be used to isolate certain modules from one another. For example, a magnetic coupling can be used between the electric machine module 212 the fluid module 200. In such an implementation, the electric machine 212 is hermetically sealed from the environment of the wellbore 104. In such an implementation, lubrication may not be provided from the lubrication manifold 254 to the isolated bearings.

FIG. 2B illustrates an example downhole-type artificial lift system 124b that can be used as the downhole-type artificial lift system 124 previously described. The downhole-type artificial lift system 124b is substantially similar to the downhole-type artificial lift system 124 with the exception of any differences described herein. As illustrated, the downhole-type artificial lift system 124b includes a first fluid module 200a and a second fluid module 200b. Each fluid module is substantially similar to the fluid module 200 previously described with the exception of any differences described herein. The first fluid module 200a and the second fluid module 200b are rotably coupled together by a coupling 224 to rotate in unison with one another. The discharge of the second fluid module 200b discharges directly into the intake of the first fluid module 200a. Both the first fluid module 200a and the second fluid module 200b are driven by the electric machine 212. Each of the described modules can include mechanical bearings that are fluidically coupled to the lubrication manifold as previously described.

FIG. 2C illustrates an example downhole-type artificial lift system 124c that can be used as the downhole-type artificial lift system 124 previously described. The downhole-type artificial lift system 124c is substantially similar to the downhole-type artificial lift system 124 with the exception of any differences described herein. As illustrated, the downhole-type artificial lift system 124b includes a first fluid module 200a, a second fluid module 200b, and a third fluid module 200c. Each fluid module is substantially similar to the fluid module 200 previously described with the exception of any differences described herein. The first fluid module 200a and the second fluid module 200b are rotably coupled together by a coupling 224 to rotate in unison with one another. The third fluid module 200c and the second fluid module 200b are rotably coupled together by a coupling 224 to rotate in unison with one another. The discharge of the second fluid module 200b discharges directly into the intake of the first fluid module 200a. The discharge of the third fluid module 200c discharges directly into the intake of the second fluid module 200b. The downhole-type electric machine is illustrated having both a first electric machine 212a and a second electric machine 212b. The first electric machine 212a and a second electric machine 212b are coupled together with a coupling 224 to rotate in unison with one another. The first fluid module 200a, the second fluid module 200b, the third fluid module 200c, the first electric machine 212a, and the second electric machine 212b are rotably coupled to one-another to rotate in unison. Each of the described modules can include mechanical bearings that are fluidically coupled to the lubrication manifold as previously described.

While several implementations of example downhole-type artificial lifts systems 124 have been described, other implementations can be used without departing from this disclosure. For example, greater or fewer fluid modules can be used depending upon the gas production rate for a specific well. Similarly, greater or fewer electric machines can be combined depending upon power requirements.

As shown in FIG. 3, the controller 150 can include a one or more processors 402 and non-transitory memory 404 containing instructions to facilitate sending and receiving signals through an input/output (I/O) interface 406. The controller can communicate with any aspect of the downhole-type artificial lift system 124 (FIG. 1), or topside components, for example, the topside pressure source 154. In some implementations, the controller 150 can be entirely located at the surface outside the wellbore 104. In some implementations, the controller 150 can be located within the wellbore 104. In some implementations, the controller can be a distributed controller; for example, a portion of the controller 150 can be located within the wellbore 104, while another portion of the controller 150 can be located at the surface outside the wellbore 104. In some implementations, the controller 150 can be only or in part an analog circuit based control.

The present disclosure is also directed to a method of monitoring, controlling, and using the downhole-type artificial lift system 124. To monitor and control downhole-type artificial lift system 124, the controller 150 is used in conjunction with sensors (e.g., velocity sensors, transducers, thermocouples, flow sensors, fluid composition sensors) to measure parameters of the production fluid and the downhole-type artificial lift system 124 at various positions within the wellbore 104 and the downhole-type artificial lift system 124. Input and output signals, including the data from the sensors, controlled and monitored by the controller 150, can be logged continuously by the controller 150 and stored in a memory 404 coupled to the controller 150. The input and output signals can be logged at any rate desirable by the operator of the downhole-type artificial lift system 124. The controller 150 can also be used to operate and control any motors, bearings, valves, or flow control devices disclosed herein. Furthermore, the controller 150 can be used with the downhole-type artificial lift system 124 to operate the downhole-type artificial lift system 124 in any matter described herein. In some implementations, the controller 150 can be used to operate other devices, such as a topside pump, compressor, or separator in conjunction with the downhole-type artificial lift system 124.

The memory 404 can store programming instructions for execution by the one or more processors 402. For example, the processors can execute programming instructions to measure and/or monitor a parameter detected by various sensors. The controller 150 interprets the signal from sensors and directs the topside pressure source to provide lubrication to the bearings at a specified rate. In another example, the controller can take a measured parameter of the artificial lift system 124, and change a rate of lubrication to the bearings in response to the measured parameter. Alternatively or in addition, the one or more processors can execute programming instructions to determine future well-flow characteristics based on a flow assurance model and control a speed of the rotor based on the future well-flow characteristics. Further details on this process are described later in this disclosure.

Figure 4:
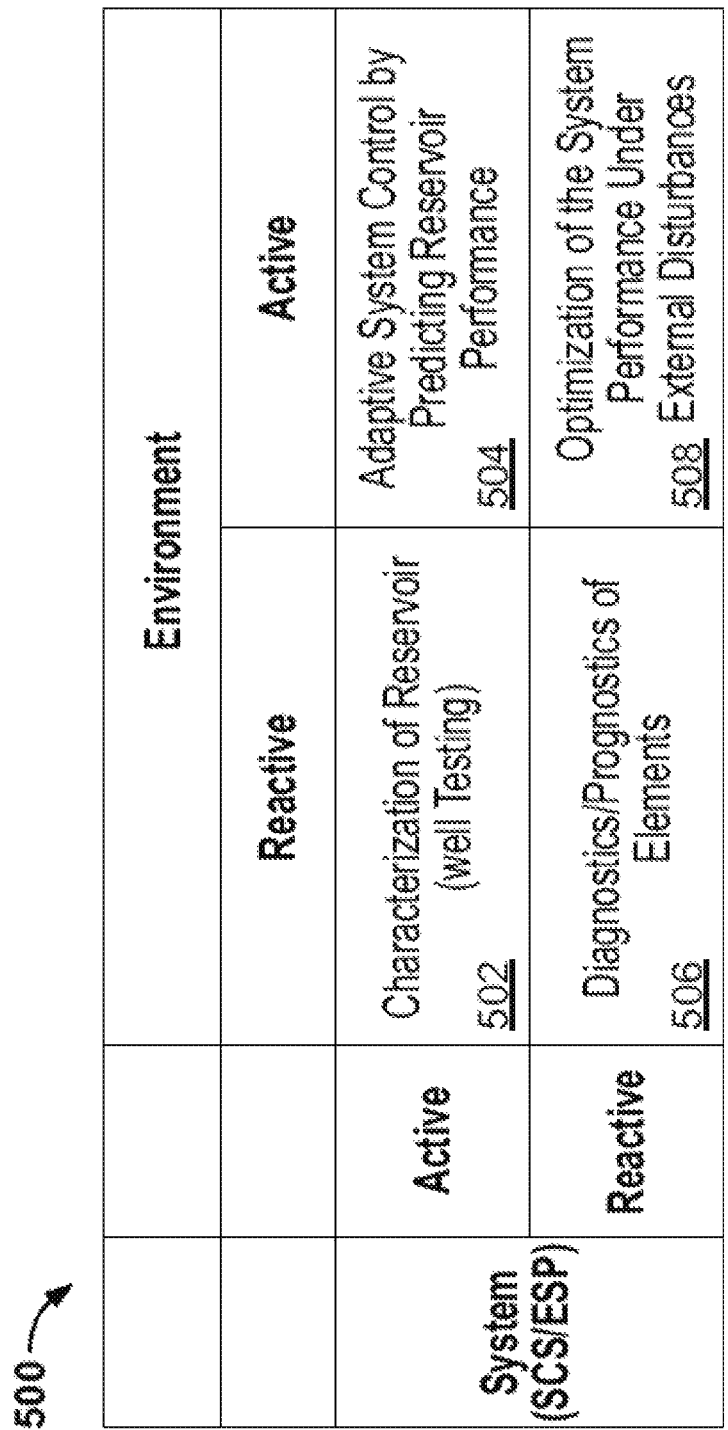
FIG. 4 is a table describing potential operating modes that can be used with the downhole-type lifting system.

FIG. 4 is a table 500 describing potential operating modes that can be used by the controller 150 to operate the downhole-type artificial lift system 124. The table is divided into four sections or modes. For each mode, the system is in either an active or a reactive state. An active state for the system is where the system is not in a fully autonomous mode. For example, the system may maintain a pressure ratio or speed, but it will not alter set-points to compensate for outside environmental changes without external input to do so. An example outside environmental change can include a slugging event. A reactive state for the system is where the system will react to or compensate for outside environmental changes, for example, by adjusting a setpoint. For example, during a slugging event, the system can change the motor speed and adjust lubrication rates to compensate for the change in load automatically and without external intervention. The environment is in a reactive state during steady state operation. For example, after start-up procedures have been conducted and the well is producing a steady flow without slugging. The environment is in an active state during non-steady state operation, for example, during start-up or during a slugging event. In general, "active" and "reactive" are indicative of a leading change and a following change, that is, an "active" component is an independent variable that changes, and the "reactive" component is a dependent variable that changes in response to the active component.

The first mode 502 occurs when the downhole-type artificial lift system acts in an active mode while the environment is in a reactive mode. This operation mode is often used to help characterize or test the well. During steady state operations, changing a set-point of the system, such as RPM or target pressure ratio, and measuring how the well reacts can result in useful information about the well. Such information can be used in a reservoir or well model. For example, one can both increase and decrease the flow rate on demand. Such a capability can provide more information of the reservoir. Example of this mode in operation are described later within this disclosure.

The second mode 504 occurs when the downhole-type artificial lift system acts in an active mode while the environment is in an active mode. This operation mode is often used to help characterize the well. During steady state operations, set-points of the system, such as RPM or target pressure ratio, are held at a steady state while the well operates in an unsteady state, such as start-up or a slugging event. By isolating one set of variables, namely the system operation, the characteristics of the well can be determined and predicted in the future. In the same operating mode, after the well has been characterized, a timed start-up procedure, with pre-set changes to RPMs, pressure ratios, and other variables, may be used to account for predictable non-steady state well behaviors. In general, an understanding of the reservoir (environment) is sufficient such that the compressor (system) can predict the change of the reservoir. For example, a compressor can predict and proactively shift its operating conditions "actively" so as to accommodating the predicted changes of the reservoir. Note that the reservoir is not reacting to the compressor, but changing by itself. Therefore both the compressor (system) and the reservoir (environment) are in the active mode. Example of this mode in operation are described later within this disclosure.

The third mode 506 occurs when the downhole-type artificial lift system acts in a reactive mode while the environment is also in a reactive mode. Such an operating mode can be used for diagnostic purposes. For example, actively changing the RPMs after an unexpected change in pressure ratio can be used to determine if a gas pocket is trapped in the fluid module 200. Such an operation mode can be used to determine if parts of the compressor are degraded or damaged. For example, after constant attack by solids in the flow streams, the compressor blades may be eroded, and the performance characteristic of the compressor is not the same as before and the flow from the reservoir is lowered. When this happens, neither the compressor (controller) nor the environment is taking the lead to change, but both reactive to the change of damaged parts. Thus, the diagnostic capability of the compressor controller should identify the need of maintenance. Example of this mode in operation are described later within this disclosure.

The fourth mode 508 occurs when the downhole-type artificial lift system acts in a reactive mode while the environment is also in a reactive mode. Such an operating mode can be used to allow the downhole-type lift device 124 to react to changes in the outside environment, such as during a slugging event, with no operator intervention. For example, actively changing the RPMs and lubrication rates during a slugging event and returning to steady state operation after the slugging event has passed.

The following paragraphs describe specific scenarios that the control system 150 can experience and react to with no operator intervention. The following scenarios are only examples. The autonomous features described herein can be applied to a number of site-specific scenarios without operator intervention. The following scenarios should not be considered a complete list of the capabilities of the controller 150 or the downhole-type artificial lift system 124.

Figure 5:
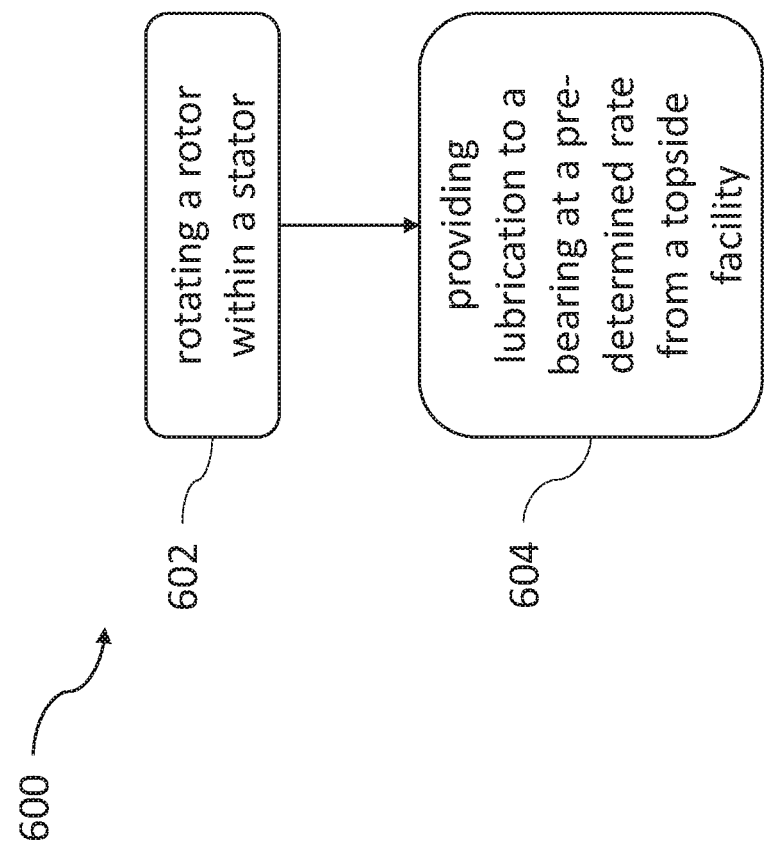
FIG. 5 is a flowchart of an example method that can be used with aspects of this disclosure.

FIG. 5 is a flowchart of an example method 600 that can be used with aspects of this disclosure. At 602, a rotor is rotated within a stator. The rotor is supported to the stator by a bearing. The rotor and the stator are positioned entirely within a wellbore. At 604, lubrication is provided to a bearing at a specified rate from a topside facility.

In some implementations, as in any of the examples in FIGS. 2A-2C, more than one bearing can be used. In such an instance, the first bearing is provided lubrication at a first specified rate from a topside facility, and the second bearing is provided lubrication at a second specified rate from a topside facility. In some implementations and/or situations, the second specified rate can be different from the first specified rate. In some instances, the second specified rate can be the same as the first specified rate. As illustrated, a third bearing and a fourth bearing are provided. Each bearing is provided its own specified rate of lubrication from a topside facility. A topside pressure source 154 provides the lubrication to the first, second, third, and fourth bearings through the main lubrication line 152, the manifold 254, and the individual lubrication lines 252 to their individual bearings. The controller 150 determines the specified lubrication rates depending on current operation conditions. For example, the controller 150 can determine a specified lubrication rate, and set a discharge pressure of the topside pressure source to supply the specified rate. In some implementations, the controller 150 can regulate active downhole components to regulate flow to individual bearings. In some implementations, additional lubrication lines can be run to each line. In such implementations, the bearings receive lubrication in the event that one of the lines becomes plugged.

Lubrication rates to each bearing can be regulated in several ways, for example, lubrication can be provided through a pre-sized flow restriction within a lubrication line. Lubrication pressures required for each application are also dependent on the depth of the device, i.e. the static head pressure resulting from the column of oil in the line, the downhole pressure of the well, the size of the oil line, and the size of any flow orifices, distribution lines or other restrictions local in the device. In some implementations, a lubrication rate can be changed. In such implementations, the flowrate can be adjusted from the topside facility. For example, a regulating valve on the discharge of a pump can be adjusted to change the flow rate of lubrication. Other flow adjustment methods can be used, for example, changing a speed of a pressure pump, changing a stroke length of a pressure pump, changing a pressure within a lubrication reservoir, or any other method that can be used modulate a flowrate of a lubricant.

In some implementations, the lubrication rate can be changed in response to a change in a downhole operation parameter. For example, responsive to a changed rotor load or RPM, lubrication can be provided to the bearing at a different rate from a topside facility than initially provided. In such an example, during a slugging event, radial and thrust loads can increase on the bearings. In such a situation, the controller 150 can recognize a slugging event and increase a lubrication rate to all bearings. In some implementations, a lubrication rate can be increased to a specific bearing. For example, a lubrication rate can be increased for the thrust bearing alone. For example, under conditions where the thrust load is at or nearer its maximum level due to a high-pressure ratio across the device, high fluid pressure at the outlet of the device, high fluid flow rate thrust the device, or high inlet pressure in the device, higher oil can be used to lubricate and cool the bearing for high load conditions. Alternatively or in addition, additional lubrication can be provided to a single radial bearing. For example, increased unbalance levels in the compressor due to material buildup on the compressor blades can cause higher radial loads on the bearings. Increased oil to the compressor radial bearings can reduce bearing heating to increase the bearing life in such higher load conditions. Such changes responsive to a changed parameter can be carried out by the controller 150.

Alternatively or in addition, the lubrication provided to the bearings can also be used to treat a producing well or an injection well. That is, the bearing lubricant can include a well treatment chemical. Well treatment chemicals can include corrosion inhibitors, defoamers, such as alkoxylated alcohol, paraffin inhibitors, such as xylene, toluene and benzene, wetting agents, such as certain soaps, and hydrate inhibitors, such as methanol or MEG. Such well treatment chemicals can be used consistently during operation, or as needed in response to changes in downhole operating parameters.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations previously described should not be understood as requiring such separation in all implementations, and it should be understood that the described components and systems can generally be integrated together in a single product or packaged into multiple products.

A number of implementations of the subject matter have been described. Nevertheless, it will be understood that various modifications may be made without departing from the spirit and scope of the subject matter. For example, aspects of this disclosure are applicable to downhole turbine generators as well. Accordingly, other implementations are within the scope of the following claims. Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A well system comprising:
   a downhole-type device comprising:
   a fluid-end comprising:
   a fluid rotor configured to move or be rotated by wellbore fluids; and
   a fluid stator surrounding and supporting the fluid rotor; and
   a first bearing coupling the fluid rotor to the fluid stator; and
   a second bearing coupling the fluid rotor to the fluid stator;
   an electric machine comprising:
   an electrical rotor rotably coupled to the fluid rotor, the electric rotor configured to rotate in unison with the fluid rotor; and
   an electrical stator surrounding and supporting the electric rotor; and
   a lubrication system fluidically coupled to the downhole-type device, the lubrication system comprising:
   a topside pressure pump; and
   a downhole-type distribution manifold within a wellbore, the distribution manifold fluidically connected to the topside pressure pump, the first bearing, and the second bearing.

2. The well system of claim 1, wherein the first bearing comprises a radial ball bearing.

3. The well system of claim 1, wherein the second bearing comprises a thrust bearing.

4. The well system of claim 1, wherein the first bearing comprises a radial bearing and a thrust bearing.

5. The well system of claim 1, wherein the distribution manifold comprises:

a first flow restriction between the topside pressure pump and the first bearing; and a second flow restriction, different from the first flow restriction, between the topside pressure pump and the second bearing.

6. The well system of claim 5, wherein the first flow restriction or the second flow restriction comprise a restriction orifice.

7. The well system of claim 1, further comprising a controller configured to:

measure a parameter of the downhole-type device; and responsive to the measured parameter, change a rate of lubrication to the first bearing or the second bearing.

* * * * *